United States Patent

[11] 3,612,983

| [72] | Inventors | Walter Erich Mehnert<br>Munich;<br>Horst Anton Heller, Munich-Allach, both of Germany |
|---|---|---|
| [21] | Appl. No. | 758,506 |
| [22] | Filed | Sept. 9, 1968 |
| [45] | Patented | Oct. 12, 1971 |
| [73] | Assignee | Entwicklungsring Sud GmbH<br>Munich, Germany |
| [32] | Priority | Sept. 13, 1967 |
| [33] | | Germany |
| [31] | | P 16 13 641.7 |
| | | Continuation-in-part of application Ser. No. 724,478, Apr. 26, 1968, now abandoned. |

[54] CONTROL SYSTEM FOR GENERATING WITH MAIN AND REVERSE FIELD WINDINGS AND RADIO TRANSMISSION FEEDBACK MEANS
6 Claims, 2 Drawing Figs.

[52] U.S. Cl. ................................................ 322/28,
322/64, 322/73
[51] Int. Cl. ........................................................ H02p 9/30
[50] Field of Search ........................................... 318/16;
322/28, 73, 64; 343/225, 228

[56] References Cited
UNITED STATES PATENTS
| 3,074,004 | 1/1963 | Schaeffer | 322/64 X |
| 3,401,328 | 10/1968 | Hartung | 322/28 |

*Primary Examiner*—Oris L. Rader
*Assistant Examiner*—H. Huberfeld
*Attorney*—William K. Serp ABSTRACT: The illustrated embodiments of this invention include an exciting generator and a power generator. Each of the generators is provided with a common tubular rotor. The armature of the exciting generator is maintained within the rotor and is fed through a controlled rectifier to the field of the power generator, which is also maintained within the rotor. The field of the power generator includes two windings, the fields of which are opposing. The output voltage of the power generator is sampled for modulation of a radio transmitter which in turn delivers power to a transmitting antenna. A receiving means is maintained within the tubular rotor and receives and demodulates the transmitted signal. The demodulated signal, together with the output of the field generator armature is applied to the control elements of the control rectifier and thereby determines the intensity of the power supplied to the power generator field windings and, correspondingly, the output of the power generator.

CONTROL SYSTEM FOR GENERATING WITH MAIN AND REVERSE FIELD WINDINGS AND RADIO TRANSMISSION FEEDBACK MEANS

This application is a continuation-in-part of U.S. Pat. application Ser. No. 724,478, filed Apr. 26, 1968, and now abandoned, entitled "Electric Generator Control system."

BACKGROUND OF THE INVENTION

BACKGROUND OF THE INVENTION

The invention relates to an electrical generator system which includes a voltage regulator and a self-excited generator. Positioned within the generator rotor are controlled rectifiers, the triggering voltage of which is provided by a radiofrequency receiving means.

A main object of the illustrated embodiment is to control the electric current supplied by the energy source (three-phase exciter generator) to the exciting field without introducing a substantial time constant to the system. The field winding of the main generator consists of two windings. The current flow through each of the windings is separately controlled so that the total exciting current which consists of the sum of the two partial currents is substantially constant at the beginning of each regulating process. In one particular embodiment, the power supplied to the windings is such that the sum of the two currents is always substantially constant. Further, an additional control element is included in the thyristor control unit so that the currents of equal magnitude can be shifted in opposite directions. Thus, during regulation, the respective component counteracting the field is weakened; and, in addition, the component augmenting the field is increased. The control voltage of the counterwinding determines the counterexciting current by means of the control element. Such voltage control is obtained relative to stabilization of the total electric current and with respect to the adjusting signals of the voltage regulator.

In accordance with an illustrated embodiment, each of the windings is provided with a different number of turns. In this manner, the weakened portion of the field of the counterwinding is maintained low, while the effective portion of the electric current is available for control purposes. This arrangement results in a field of magnetic flux which is the resultant of the magnetic flux created by the two windings. It is possible to eliminate the time constant of the auxiliary exciter by shifting the currents in both windings without changing the total exciting current. Furthermore, as a result of the shifting of the electrical currents during and/or at the beginning of the respective control process, the counteracting component of the field at any given time is weakened, and the augmenting component is amplified by means of the current shift.

Other additional features and advantages of this invention will become apparent through reference to the following description and accompanying drawings which show two illustrative embodiments of this invention.

DESCRIPTION OF THE PREFERRED EMBODIMENTS

Figure 1:
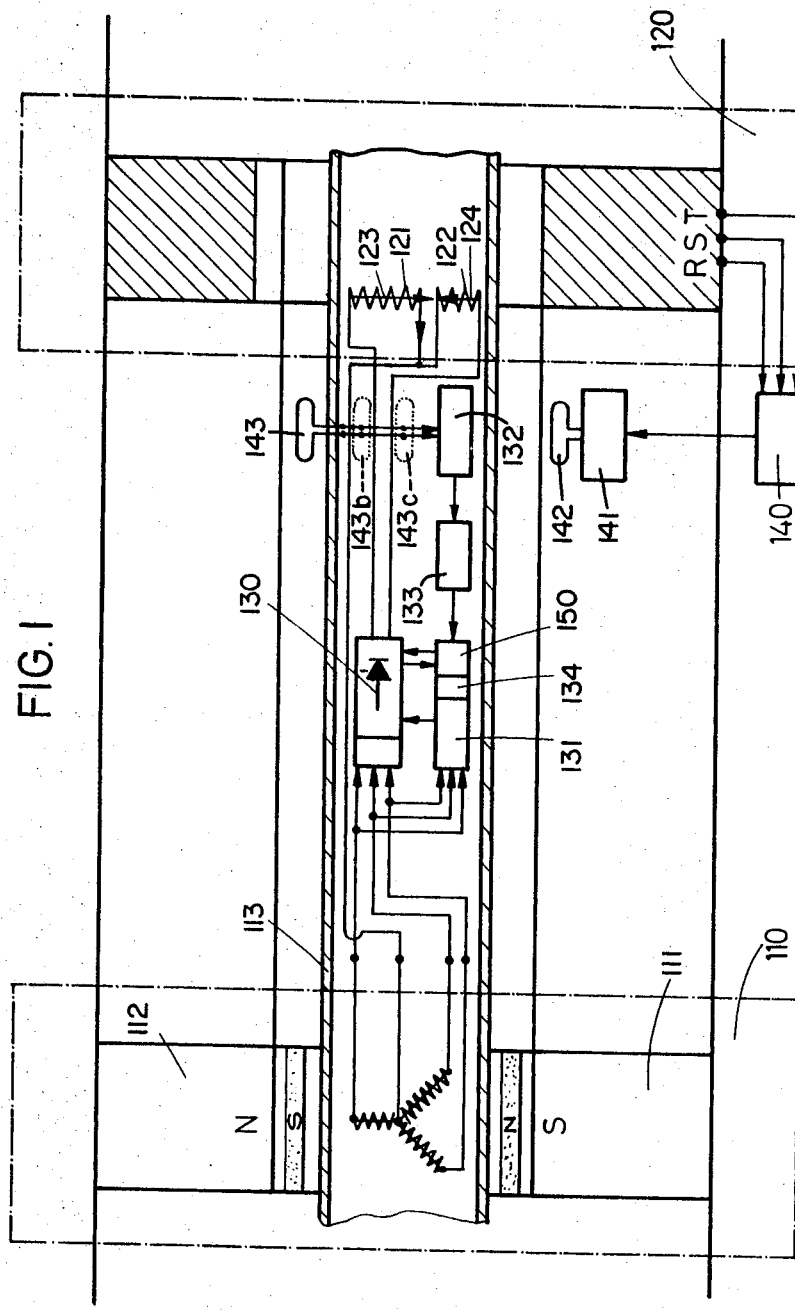
FIG. 1 is a diagrammatic illustration of a generator system embodying certain features of this invention.

The illustrated embodiment includes a brushless, three-phase exciter generator 110 having an armature 109 rotating in a field produced by means of permanent magnets 111 and 112. In accordance with the illustrated embodiment, the exciter is provided with at least twice as many magnetic poles as are included in a main generator 120 so as to increase the regulation speed in a manner to be subsequently further described. The three-phase exciter generator 110 supplies field excitation to the main generator. Serving to house the regulating components of the system is a hollow generator rotor 113. Field excitation is supplied to a pair of field windings 121 and 122 of the main generator 120 through a plurality of controlled rectifiers. In accordance with the illustrated embodiment, the controlled rectifiers are in the form of thyristors 130. An example of a thyristor suitable for use in this system is one made by Motorola, type 2N184. The voltage which controls the firing time of each of the thyristors 130 is determined by firing control elements 131, 134 and 150. These firing control elements can be selected form standard, commercially available items. For example, a suitable power unit 131 is type EAL 50-250 EG produced by Trygon Electronic Ltd. Examples of control members suitable for this system are (1) Zeltex-Zel 1 produced by Control; and (2) SN 72 741-N or P produced by Texas Instruments. The control members are termed "push-pull addition stage" consisting of two push-pull connected integrated calculation amplifiers. The units 150 are two integrated ignition circuits for each of the thyristor star connections per assigned winding. Units of a type suitable for this system are manufactured by A.E.G. (Germany) type 1S 3–U3. The firing elements are in turn controlled by a voltage regulator 140 which modulates the radiofrequency signal supplied by a transmitter 141. The modulated output of transmitter 141 is connected to a transmitting antenna 142 as shown. The modulated signal is received and demodulated by a receiving means in the form of a receiving antenna 143, a receiver 132 and a demodulator 133, the output of the receiver 132 being coupled to the control elements 131, 134 and 160 through the demodulator 133.

The transmitter 141 is an ordinary oscillator set for the transmitting frequency with a corresponding modulation stage, wherein the control signal is mixed in a known manner with the carrier signal. The antennae 142 are standard dipole antennas customary in the UHF range, of which the receiving antenna is seated directly at the end of the shaft and the transmitting antenna is directly opposite it. An example of the type voltage regulator that can be used in this system is the type G-20-B9-2 made by the German firm A.E.G.

Figure 2:
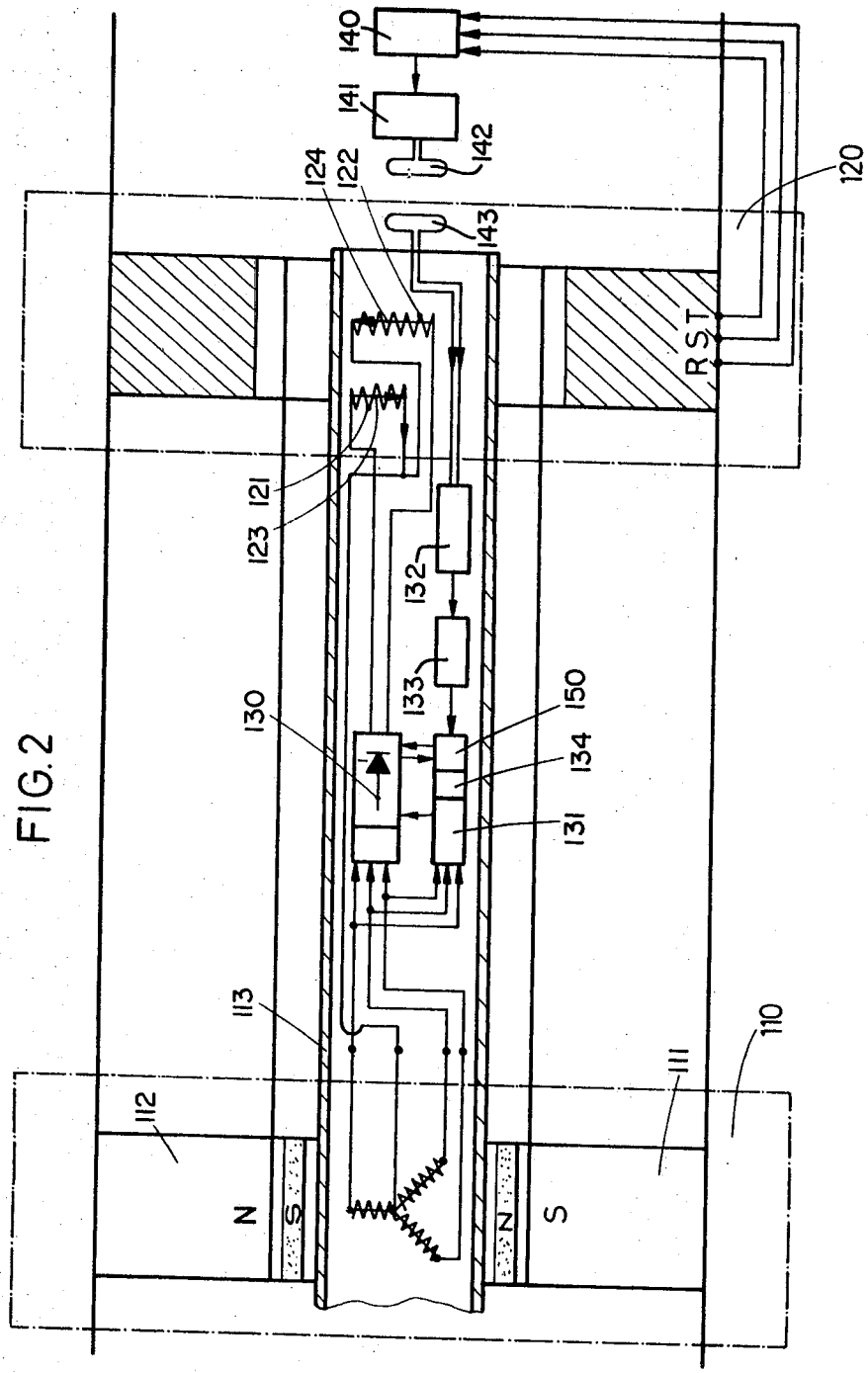
FIG. 2 is a diagrammatic illustration of an alternate embodiment of a generator system embodying certain features of this invention.

For example, should a voltage rise occur due to a load drop, a portion of the electric current of the augmenting exciting winding 121 corresponding to the magnitude of the voltage increase is supplied to the counterwinding 122. Thus, the main field component 123 is weakened and the counteracting field component 124 is increased. This dual-acting control system, which as previously mentioned displays a practically unretarded reaction speed, directly influences the generator voltage. In addition to the substantial elimination of the time constant of the exciter, that is the exciter and any auxiliary exciters, a further increase in the total control reaction time is obtained. As previously mentioned, the auxiliary exciter 110 is provided with at least twice as many pole pairs 111 and 112 as the main generator 120, and the frequency of the auxiliary exciter 110 is increased to twice the frequency of the main generator thereby resulting in almost instantaneous control action. FIG. 2 shows an embodiment similar to that of FIG. 1 but with the receiving antenna 143 mounted at the end of the rotor 113 and the transmitting antenna 142 mounted adjacent thereto.

Although only two specific embodiments of this invention have been herein shown and described, it should be understood that certain details of the construction shown may be altered without departing from the spirit and scope of this invention as defined by the following claims.

1. An electric generator system comprising an exciting generator and a power generator, the output voltage of said exciting generator serving to supply voltage to the field of said power generator; a rotor shaft common to both said exciting generator and said power generator; a controlled rectifier means for controlling the current flow from said exciting generator output to the field of said power generator so as to control the intensity of the magnetic filed thereof; a radiofrequency transmitting means coupled to the output of said power generator; a radiofrequency receiving means coupled to said transmitting means, the output of said radiofrequency receiving means being applied to the control elements of said controlled rectifier means so as to control the field strength of said generator in accordance with said output and wherein the field winding of the power generator comprises at least first and second windings which are separately excited so that the total exciting current, made up of the currents in the first and second windings, remains constant at the beginning of each control process, said first winding comprising a main winding for augmenting said field and said second winding comprising a further winding for counteracting said field.

2. An electric generator system according to claim 1 wherein the current intensity through the field windings of the main generator is controlled by a firing voltage control element which controls the firing point of a thyristor so that the sum of the two field currents remains substantially constant.

3. An electric generator system according to claim 2 wherein the firing voltage control element is associated with additional control elements which shift the phase of the currents in opposite directions so that the respective component counteracting the field is weakened and the main component augmenting the field is increased.

4. A generator system according to claim 3 wherein the firing voltage control unit of the thyristor has two components, a first of which influences the counter exciting current with respect to stabilization of the total electric current, and the second of which receives the adjusting signals from a voltage regulator.

5. A generator system according to claim 1 wherein said field windings of the power generator have an unequal number of turns.

6. A generator system according to claim 5 wherein the exciter generator has a greater number of poles than the power generator so that the frequency of the exciter generator is at a greater frequency than that of the power generator.